UNITED STATES PATENT OFFICE.

STEPHEN A. KINGSLAND, OF MIDDLETOWN, CONNECTICUT, ASSIGNOR TO BENJAMIN DOUGLAS, JR., OF SAME PLACE.

STOVE-POLISH.

SPECIFICATION forming part of Letters Patent No. 434,790, dated August 19, 1890.

Application filed May 6, 1890. Serial No. 350,843. (No specimens.)

*To all whom it may concern:*

Be it known that I, STEPHEN A. KINGSLAND, of Middletown, in the county of Middlesex and State of Connecticut, have invented a new and useful Composition of Matter to be Used as a Liquid Stove-Polish, of which the following is a specification.

The composition consists of the following ingredients, combined in the proportions stated, viz: water, one gallon; borax, one-half pound; shellac, one ounce; white wax, one-half ounce; burned cork, one ounce.

In order to prepare the composition, I proceed as follows: The gallon of water is heated in a suitable vessel, and then the borax is placed in it to dissolve. The mixture is left to cool, and then the shellac, dissolved in alcohol, is put into the mixture, after which the white wax is added to prevent the shellac from blistering, turning red, or losing its gloss. The burned cork in a pulverized state is then added to the other ingredients, the entire mixture being thoroughly mingled by agitation.

In using the above-named composition it is applied to a stove, preferably, by means of a suitable brush and left to dry and harden, which takes place in a very short time. No rubbing or scrubbing whatever is necessary in order to give the stove a polished appearance, as the composition after applying and drying forms an enamel or polish having a fine appearance.

As the composition of matter is in a liquid state, it can be easily kept in bottles or other suitable receptacles and readily applied at any time on the stove, whether the latter is cold or hot, without any rubbing whatever, thus saving considerable labor and time.

Having thus fully described my invention, I claim as new and desire to secure by Letters Patent—

The herein-described composition of matter to be used as a liquid stove-polish, consisting of water, borax, shellac, wax, and burned cork, in about the proportions specified.

STEPHEN A. KINGSLAND.

Witnesses:
    THEO. G. HOSTER,
    C. SEDGWICK.